United States Patent
Kata et al.

(10) Patent No.: US 10,798,591 B2
(45) Date of Patent: Oct. 6, 2020

(54) OPTIMIZING MULTI-ANTENNA DEVICE CONFIGURATION

(71) Applicant: Cisco Technology, Inc., San Jose, CA (US)

(72) Inventors: Madhusudana Rao Kata, Fremont, CA (US); Shivaji P. Diwane, Pleasanton, CA (US); Keith Dsouza, South San Francisco, CA (US); Sendilvadivu Ganesan, Milpitas, CA (US); Vivek Jain, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 267 days.

(21) Appl. No.: 15/581,007

(22) Filed: Apr. 28, 2017

(65) Prior Publication Data
US 2018/0317100 A1 Nov. 1, 2018

(51) Int. Cl.
*H04W 4/00* (2018.01)
*H04W 24/02* (2009.01)
(Continued)

(52) U.S. Cl.
CPC .......... *H04W 24/02* (2013.01); *H04B 7/022* (2013.01); *H04B 7/0404* (2013.01); *H04B 7/0608* (2013.01); *H04B 7/0613* (2013.01); *H04B 7/0814* (2013.01); *H04B 17/29* (2015.01); *H04L 43/10* (2013.01); *H04B 17/23* (2015.01); *H04B 17/318* (2015.01); *H04L 67/12* (2013.01)

(58) Field of Classification Search
None
See application file for complete search history.

(56) References Cited

U.S. PATENT DOCUMENTS

| 8,515,496 B2 | 8/2013 | Cheng et al. |
| 9,215,004 B2 | 12/2015 | Ogura et al. |

(Continued)

FOREIGN PATENT DOCUMENTS

WO WO-2016164042 A1 10/2016

OTHER PUBLICATIONS

"4G LTE LEDs", Cisco 4G LTE Software Configuration Guide, http://www.cisco.com/c/en/us/td/docs/routers/access/interfaces/software/feature/guide/ehwic-4g-ltesw-book.html#con_1346745, 86 pages, Accessed Nov. 11, 2016, Cisco.

*Primary Examiner* — Zewdu A Beyen
(74) *Attorney, Agent, or Firm* — Behmke Innovation Group LLC; James M. Behmke; James J. Wong (57) ABSTRACT

In one embodiment, a diagnostic device determines signal strengths of two antennas of a multi-antenna device. When the signal strength of each of the two antennas is unacceptable, the diagnostic device provides a recommendation to adjust each of the two antennas. Alternatively, when the signal strength of a first antenna of the two antennas is unacceptable while the signal strength of a second antenna of the two antennas is acceptable, the diagnostic device provides a recommendation to adjust the first antenna. However, when the signal strength of each of the two antennas is acceptable, but a difference between the signal strength of a first antenna and a second antenna of the two antennas is greater than a threshold, then the diagnostic device determines a weaker antenna with weaker signal strength between the first antenna and the second antenna, and provides a recommendation to adjust the weaker antenna.

20 Claims, 7 Drawing Sheets

(51) Int. Cl.

| | | |
|---|---|---|
| *H04B 7/08* | (2006.01) | |
| *H04B 7/0404* | (2017.01) | |
| *H04B 7/022* | (2017.01) | |
| *H04B 7/06* | (2006.01) | |
| *H04L 12/26* | (2006.01) | |
| *H04B 17/29* | (2015.01) | |
| H04B 17/318 | (2015.01) | |
| H04B 17/23 | (2015.01) | |
| H04L 29/08 | (2006.01) | |

(56) References Cited

U.S. PATENT DOCUMENTS

| | | | |
|---|---|---|---|
| 9,294,182 B2 | 3/2016 | Rousu et al. | |
| 2013/0342403 A1 | 12/2013 | Katz | |
| 2014/0003558 A1* | 1/2014 | Ichikawa | H04L 7/042 |
| | | | 375/343 |
| 2014/0106684 A1* | 4/2014 | Burns | H01Q 1/243 |
| | | | 455/78 |
| 2014/0323141 A1* | 10/2014 | Boos | H04B 7/02 |
| | | | 455/452.1 |
| 2015/0358979 A1* | 12/2015 | Puranik | H04W 72/085 |
| | | | 455/452.2 |
| 2016/0254585 A1* | 9/2016 | Feng | H01Q 1/1257 |
| | | | 343/757 |
| 2017/0207530 A1* | 7/2017 | Anderson | H04B 7/0408 |

\* cited by examiner

OPTIMIZING MULTI-ANTENNA DEVICE CONFIGURATION

TECHNICAL FIELD

The present disclosure relates generally to computer networks, and, more particularly, to optimizing multi-antenna device configuration.

BACKGROUND

Many wireless devices, such as "Internet of Things" (IoT) devices that have embedded cellular modems, have a main antenna and diversity antenna that are used to transmit and receive data over a wireless (e.g., cellular) network. Antenna diversity, in particular, uses the two (or more) antennas to improve the quality and reliability of a wireless link. However, such multi-antenna devices have common issues that are observed while deploying these devices, resulting in poor performance of the device or occasional loss of service.

BRIEF DESCRIPTION OF THE DRAWINGS

The embodiments herein may be better understood by referring to the following description in conjunction with the accompanying drawings in which like reference is numerals indicate identically or functionally similar elements, of which.

DESCRIPTION OF EXAMPLE EMBODIMENTS

Overview

According to one or more embodiments of the disclosure, a diagnostic device determines signal strengths of two antennas of a multi-antenna device. When the signal strength of each of the two antennas is unacceptable, the diagnostic device provides a recommendation to adjust each of the two antennas. Alternatively, when the signal strength of a first antenna of the two antennas is unacceptable while the signal strength of a second antenna of the two antennas is acceptable, the diagnostic device provides a recommendation to adjust the first antenna. However, when the signal strength of each of the two antennas is acceptable, but a difference between the signal strength of a first antenna and a second antenna of the two antennas is greater than a threshold, then the diagnostic device determines a weaker antenna with weaker signal strength between the first antenna and the second antenna, and provides a recommendation to adjust the weaker antenna.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services to the local nodes in the network, in contrast to cloud-based approaches that rely on remote data centers/ cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Figure 1:
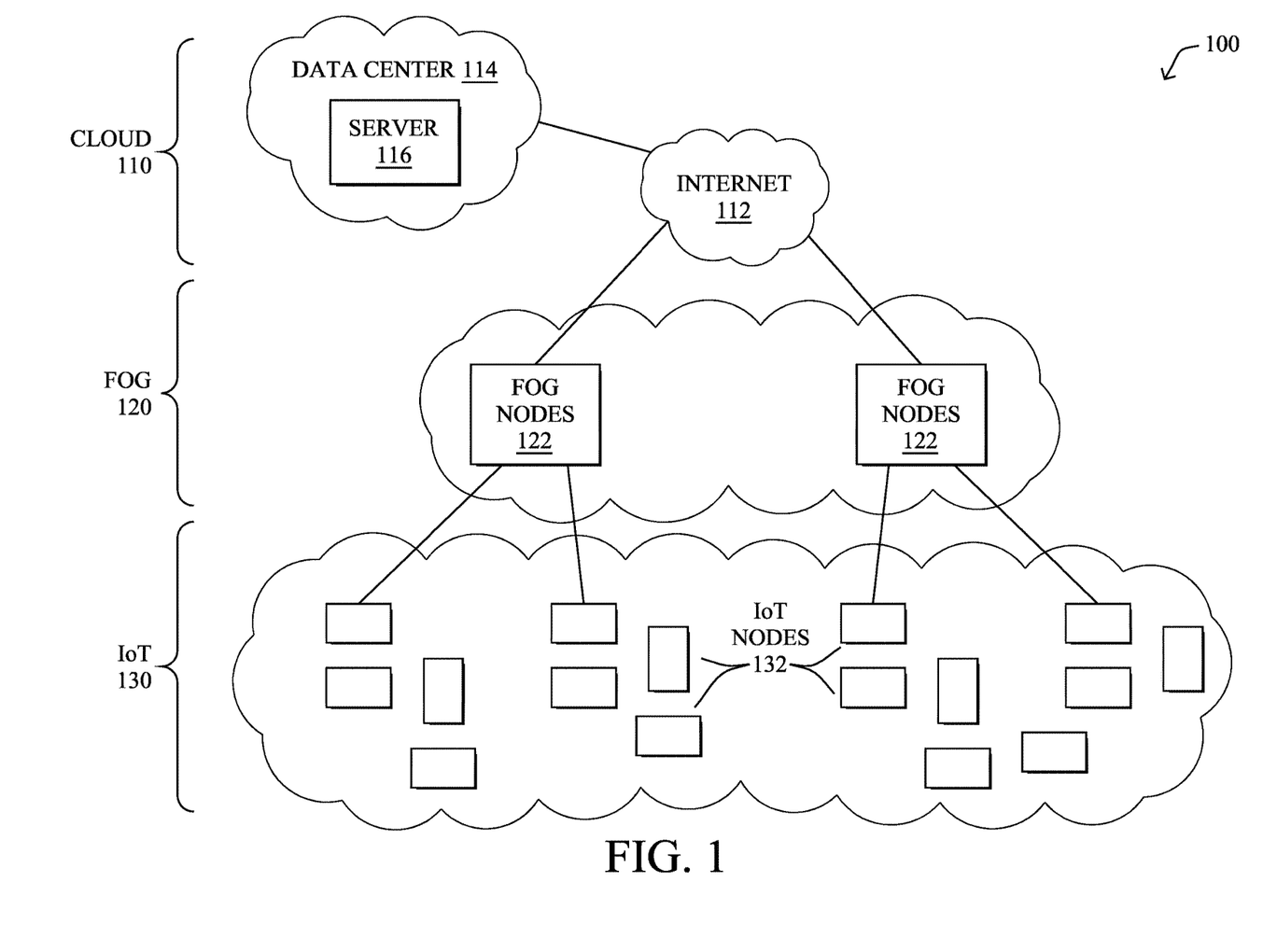
FIG. 1 illustrates an example computer network.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 2:
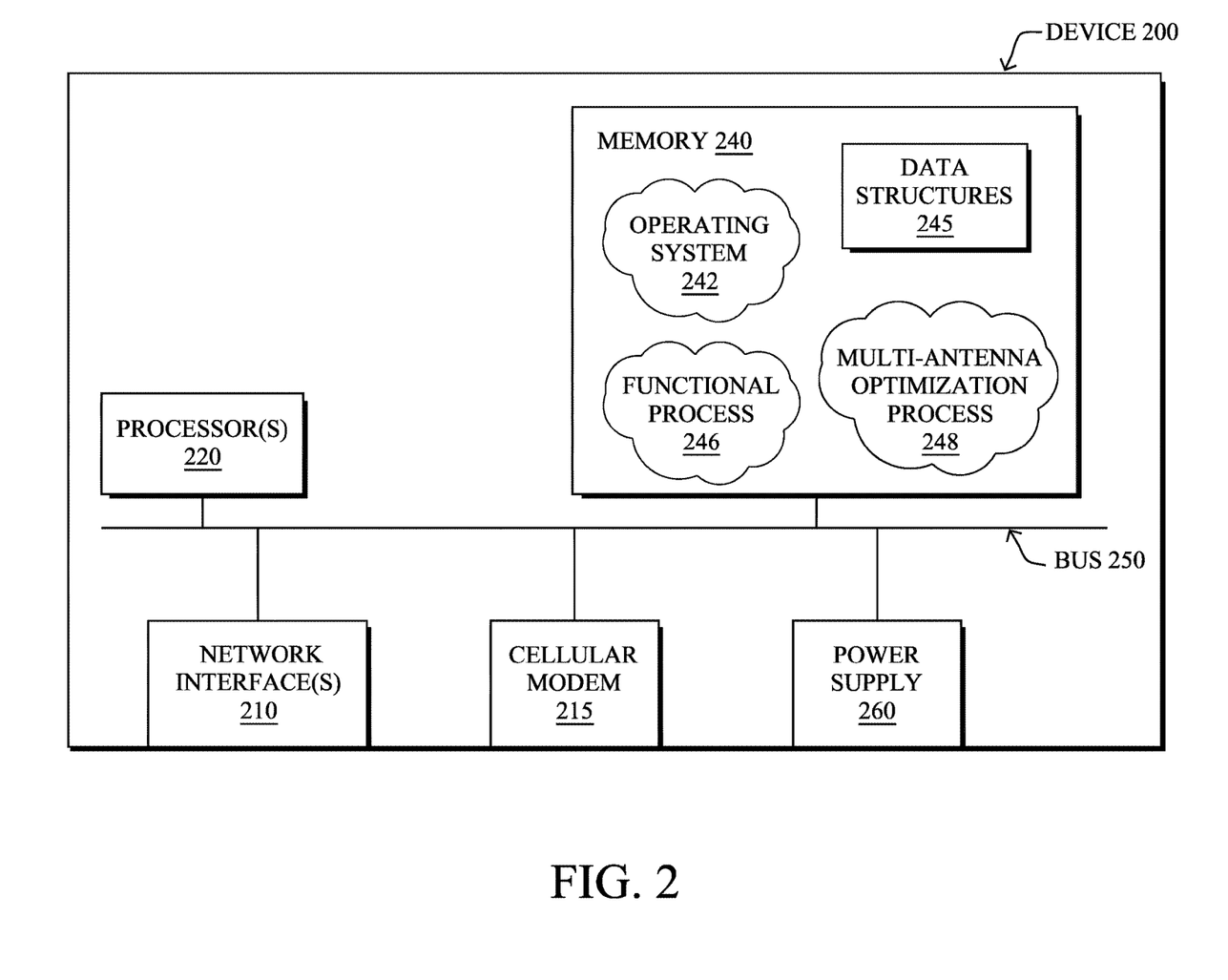
FIG. 2 illustrates an example computing device/node.

FIG. 2 is a schematic block diagram of an example computing device 200 that may be used with one or more embodiments described herein e.g., as any of the devices shown in FIG. 1 above, and particularly as specific devices as described further below. The device may comprise one or more network interfaces 210 (e.g., wired, wireless, and in particular cellular interface 215, etc.), at least one processor 220, and a memory 240 interconnected by a system bus 250, as well as a power supply 260 (e.g., battery, plug-in, etc.).

The network interface(s) 210 and 215 contain the mechanical, electrical, and signaling circuitry for communicating data over links coupled to the network 100, e.g., is providing a data connection between device 200 and the data network, such as the Internet. The network interfaces may be configured to transmit and/or receive data using a variety of different communication protocols. For example, interfaces 210 may include wired transceivers, WiFi transceivers, or the like, and cellular interface 215 may include cellular transceivers (e.g., a 4G LTE cellular modem), each to allow device 200 to communicate information to and from a remote computing device or server over an appropriate network. Note, further, that the nodes may have two different types of network connections 210, e.g., wireless and wired/physical connections, and that the view herein is merely for illustration. Also, while the network interface 210 is shown separately from power supply 260, for devices using powerline communication (PLC), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative multi-antenna optimization process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), and so on.

It will be apparent to those skilled in the art that other processor and memory types, including various computer-readable media, may be used to store and execute is program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Optimizing Multi-Antenna Device Configuration

As noted above, Many wireless devices, such as IoT devices that have embedded cellular modems, have a main antenna and diversity antenna that are used to transmit and receive data over a wireless (e.g., cellular) network. As also noted above, such multi-antenna devices have common issues that are observed while deploying these devices, resulting in poor performance of the device or occasional loss of service. In most cases, since these antennas are collocated, the expectation is to have similar signal conditions on both antennas, though this is not always the case.

Listed below are some of the most common issues that are observed while deploying multi-antenna devices. These problems result in poor performance of the device or occasional loss of service.

1. Location based—Multi-antenna devices are usually installed in indoor and outdoor locations, where there may be environmental factors that may attenuate the signal being received by the cellular modems.
2. Antenna connectivity—Multi-antenna devices are not installed correctly in the field, e.g., the main or diversity antenna is not connected or is loosely connected.
3. RF environment—These devices may be installed at a location where there may be material that interferes with the radio signal due to proximity to the antennas.

For example, when a user installs a router or other wireless device in a location, they may occasional experience issues with connectivity (e.g., connecting, disconnecting, reconnecting, weak signals, etc.). Determining the cause of these problems has been historically difficult, and is often due to physical configuration of the multiple antennas, is rather than an issue with the device itself. Although existing designs may use LEDs or other indicators to indicate signal strengths, the signal strengths alone are not sufficient to show interference of a signal, and such existing designs also do not allow for remotely identifying what the problem may be.

The techniques herein, therefore, provide a recommendation to a user about antenna position and radio frequency (RF) signal conditions for multi-antenna devices based on signal measurements from each antenna. This allows configuration of the multi-antenna device in a manner that results in a better quality wireless signal for the device, and thus less chances of poor or lost wireless connectivity. That is, by looking at the signal strengths at both antennas (e.g., two levels of information: overall power (volume of the signal) and quality of signal (understanding of the signal)), the techniques herein can determine that receiving different signals at two antennas implies that something not right (e.g., one or more are connected while others are not, or one or more is interfered with, while others are not, and so on), and may make a suggestion on how to correct it.

Specifically, according to one or more embodiments of the disclosure as described in detail below, a diagnostic device determines signal strengths of two antennas of a multi-antenna device. When the signal strength of each of the two antennas is unacceptable, the diagnostic device provides a recommendation to adjust each of the two antennas. Alternatively, when the signal strength of a first antenna of the two antennas is unacceptable while the signal strength of a second antenna of the two antennas is acceptable, the diagnostic device provides a recommendation to adjust the first antenna. However, when the signal strength of each of the two antennas is acceptable, but a difference between the signal strength of a first antenna and a second antenna of the two antennas is greater than a threshold, then the diagnostic device determines a weaker antenna with weaker signal strength between the first antenna and the second antenna, and provides a recommendation to adjust the weaker antenna.

Illustratively, the techniques described herein may be performed by hardware, software, and/or firmware, such as in accordance with the multi-antenna optimization process 248 (e.g., on a diagnostic device), which may include computer executable instructions executed by the processor 220 to perform functions relating to the techniques described herein, e.g., in conjunction with corresponding processes of other devices in the computer network as described herein (e.g., the multi-antenna device being diagnosed).

Figure 3:
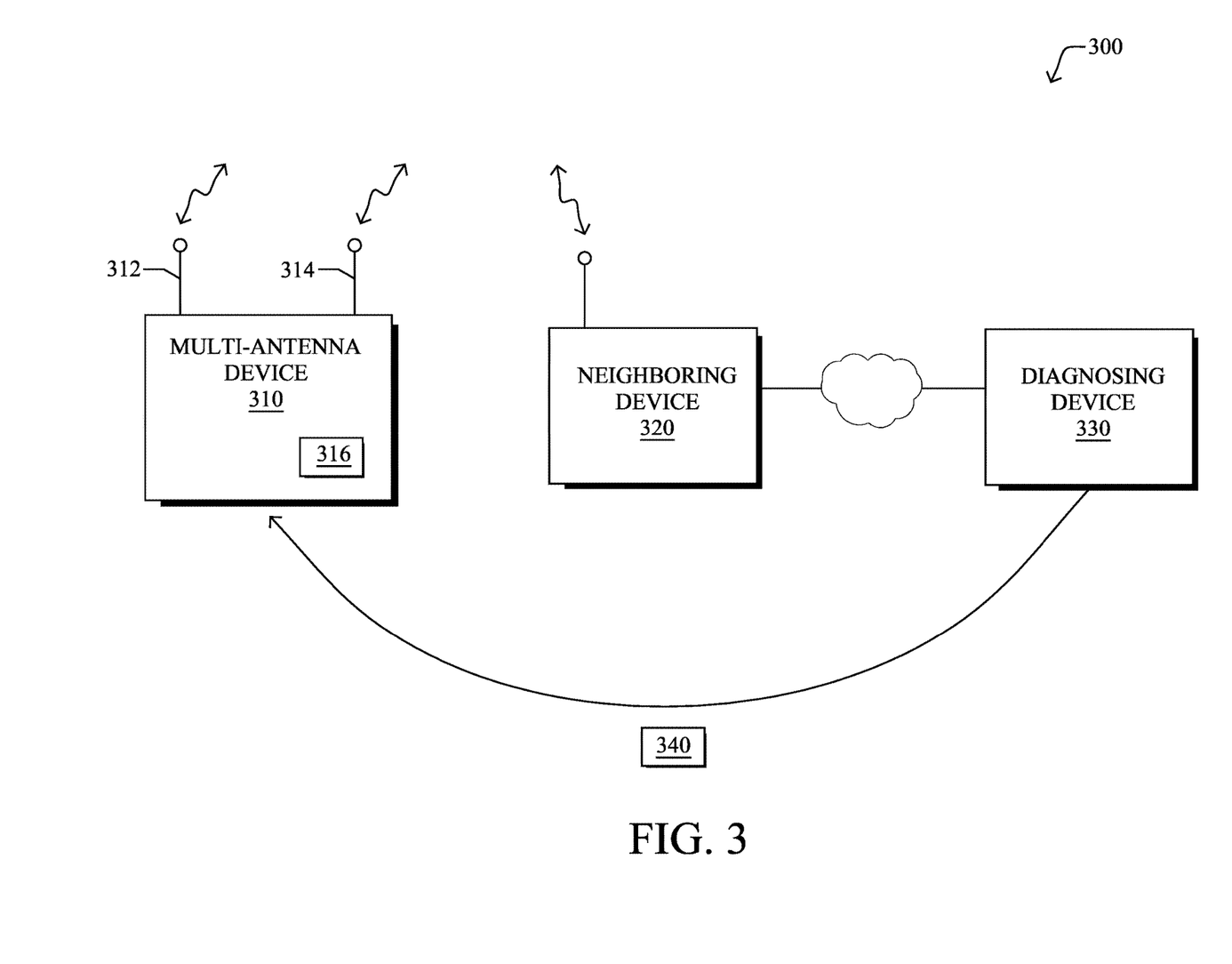
FIG. 3 illustrates an example simplified wireless network.

Operationally, the techniques herein retrieve the radio parameters from the multi-antenna device (e.g., from cellular modem 215), and formulate a criteria to provide assistance for the optimal placement of the device and/or its antennas for better performance. With reference to FIG. 3, which illustrates a simplified network 300 having a multi-antenna device 310 (with first antenna 312 and second antenna 314) may communicate wirelessly with another device 320 (e.g., a cellular gateway), such as by using the cellular modem 215 and the two antennas. Illustratively, the first antenna 312 may be a main antenna (e.g., "Rx0", for both transmitting and receiving—Tx/Rx), and the second antenna 314 may be a diversity antenna (e.g., "Rx1", configured for receiving only—Rx). As shown, a diagnostic device 330, such as a remote server, is capable of receiving information from the multi-antenna device 310, such as through a cellular connection or other network connection (e.g., Internet, Ethernet, etc.). Note that in one embodiment, the diagnostic device 330 may be co-located with (i.e., is a component of) the multi-antenna device 310 (i.e., device 310 is self-diagnosing). As described below, the diagnosing device 330 may be configured to send one or more messages (e.g., provided recommendations) 340 to the multi-antenna device 310 (e.g., via the antennas 312/314, via other communication interfaces, or else to a user or administrator associated with the multi-antenna device 310, such as through an SMS, email, command-line interface (CLI), log entries, etc.). Also, as described below, one or more indicators 316 (e.g., display, lights, LEDs, etc.) on the multi-antenna device may also relay the provided recommendations to a user.

As mentioned above, both antennas of a multi-antenna device may be connected, but this does not simply imply that they are connected and/or configured properly. There is is a possibility of loose connectivity or interference from reflective materials or other sources. According to the techniques herein, these factors can be determined based on signal strengths and signal quality information received form multi-antenna device 310 (e.g., from its modem 215).

Figure 4A:
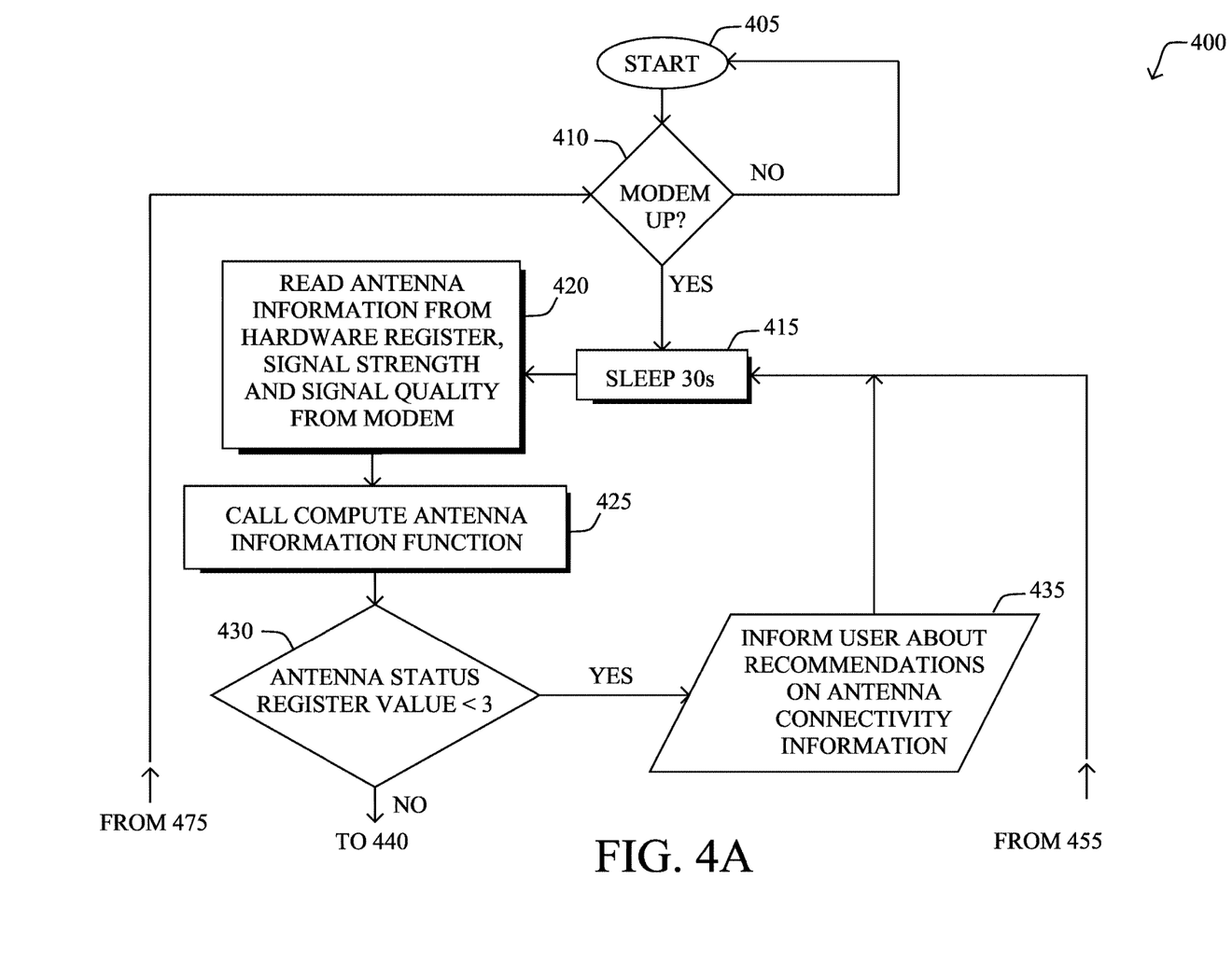
FIGS. 4A-4B illustrate an example procedure for optimizing multi-antenna device configuration.
Figure 4B:
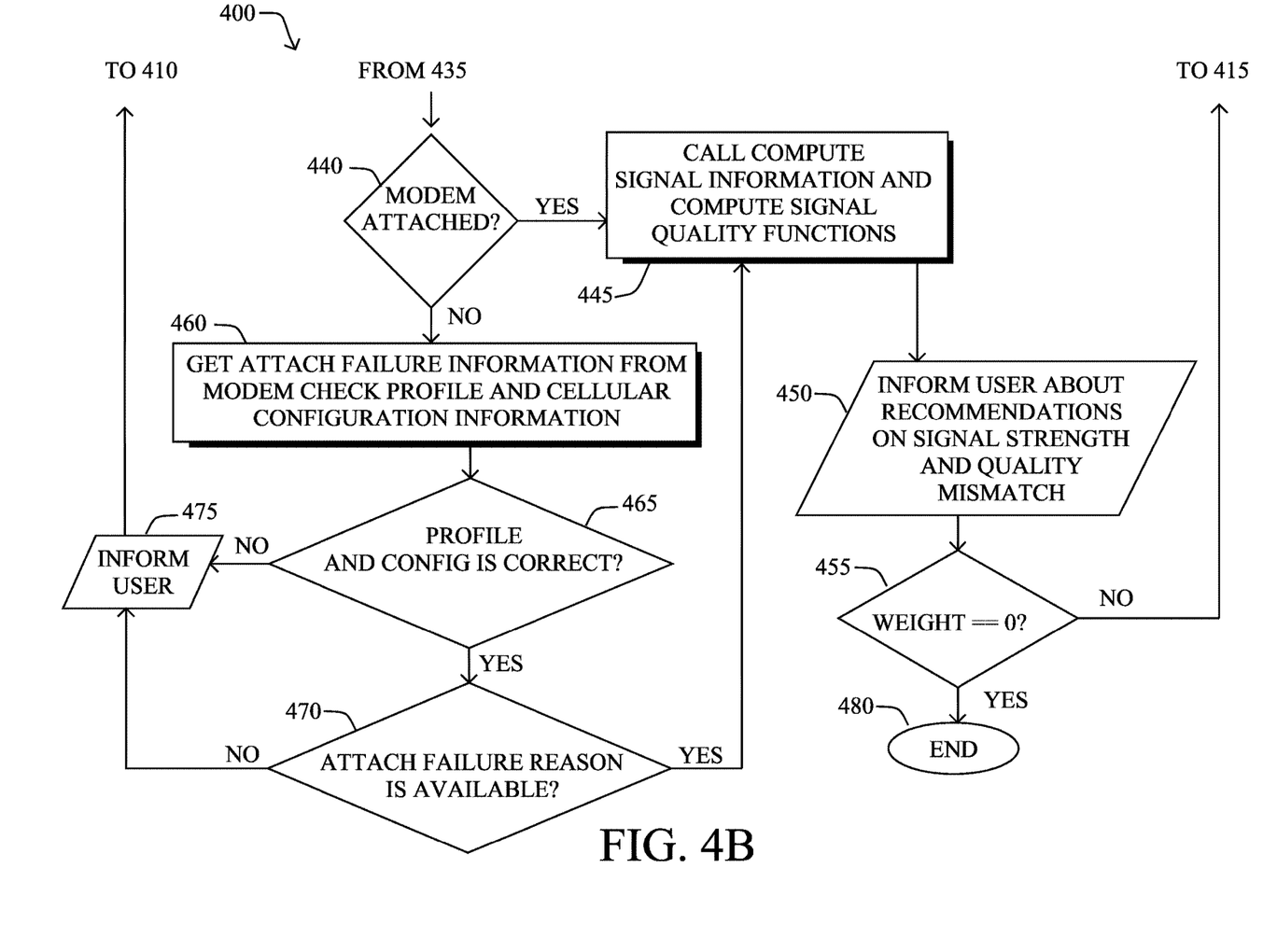

FIGS. 4A-4B illustrate an example procedure for optimizing multi-antenna device configuration in accordance with one or more embodiments herein. In particular, procedure 400 starts in step 405, and continues to step 410, where once a modem is "up" (i.e., operational), then after an optional time delay (e.g., 30 seconds) in step 415, the diagnosing device can read Antenna Information from Hardware Registers of the multi-antenna device 310, as well as Signal Strength and Signal Quality from the modem 215 in step 420. A function call may then be made in step 425 to compute the Antenna Information in order to determine the connectivity of the antennas 312 and 314. For instance, an example "COMPUTE Antenna Information" function call may comprise:

```
-- COMPUTE Antenna Information --
===============
IF AntennaStatusRegisterValue == 0;
  Recommendation: Main and Diversity Antennas are not connected
ELSE IF AntennaStatusRegisterValue == 1
  Recommendation: Diversity Antenna is not connected
ELSE IF AntennaStatusRegisterValue == 2
  Recommendation: Main Antenna is not connected
ELSE IF AntennaStatusRegisterValue == 3
  Recommendation: Main and Diversity Antennas are connected
ENDIF
===============
```

Accordingly, if any of the antennas are not connected (i.e., the value is less than 3 in the example above), then in step 430 the diagnosing device may inform a user about the recommendations on the Antenna Connectivity information (that is, the recommendation to correct the situation).

If the modem is attached to the network in step 435 (i.e., is in communication with the network), then in step 440 the diagnosing device may make function calls to compute Signal Information and Signal Quality, where if there are recommendations available, then in step 445 informs the user about such recommendations on Signal strength and quality mismatching, accordingly. In particular, example functions for computing signal quality (i.e., whether an adjustment needs to be made) and for computing signal information (i.e., giving weights for antenna ports based on signal strength) are described below:

```
-- COMPUTE Signal Quality --
===============
IF Signal Quality > good quality
  Recommendation: no need a change in antenna position
ELSE
```

```
 Recommendation: need a change in antenna position
ENDIF
===============
-- COMPUTE Signal Information --
===============
IF Signal Strength of Main port and Diversity port > good signal strength
  IF ((modulo of Signal Strength of Main and Signal Strength of
  Diversity) > 5dB)
    IF((Signal Strength of Main – Signal Strength of Diversity) > 0 )
      weight = 1
      Recommendation: need a change in Main antenna position
    ELSE((Signal Strength of Main – Signal Strength of Diversity) > 0 )
      weight = 2
      Recommendation: need a change in Diversity antenna position
    ENDIF
  ELSE
    weight = 0
    Recommendation: no need change in antenna position
  ENDIF
ELSE IF Signal Strength of Main or Diversity port > good signal strength
  IF Main port > good signal strength
    weight = 3
    Recommendation: need a change in Diversity antenna position or
    connectivity
  ELSE
    weight = 4
    Recommendation: need a change in Main antenna position or
    connectivity
  ENDIF
ELSE
  weight = 5
  Recommendation: need a change in both antenna position or
  connectivity
ENDIF
===============
```

If the weight equals "0" in step 450 (i.e., no changes are necessary), then the procedure 400 may end in step 480. Otherwise, if changes were recommended, the procedure may repeat back to step 415 to allow some time to pass to check whether the changes were successful.

Note that if in step 435 the modem is not attached to the network, then in step 455 the diagnosing device 330 may attempt to get Attach Failure information from modem and check profile and cellular configuration information in step 460. If the profile and configuration are incorrect in step 465, or if the profile and configuration is correct in step 465 and an Attach failure reason is not available in step 470, then the procedure continues step 475 to inform the user of the situation (e.g., modem not attached, incorrect profile or configuration, or no attach failure reason), and waits for the modem to attach. Otherwise, if an Attach failure reason is available in step 470, then the procedure returns to step 440 to run function calls for computing Signal Information and Signal Quality, and making recommendations, as described above.

Figure 5A:
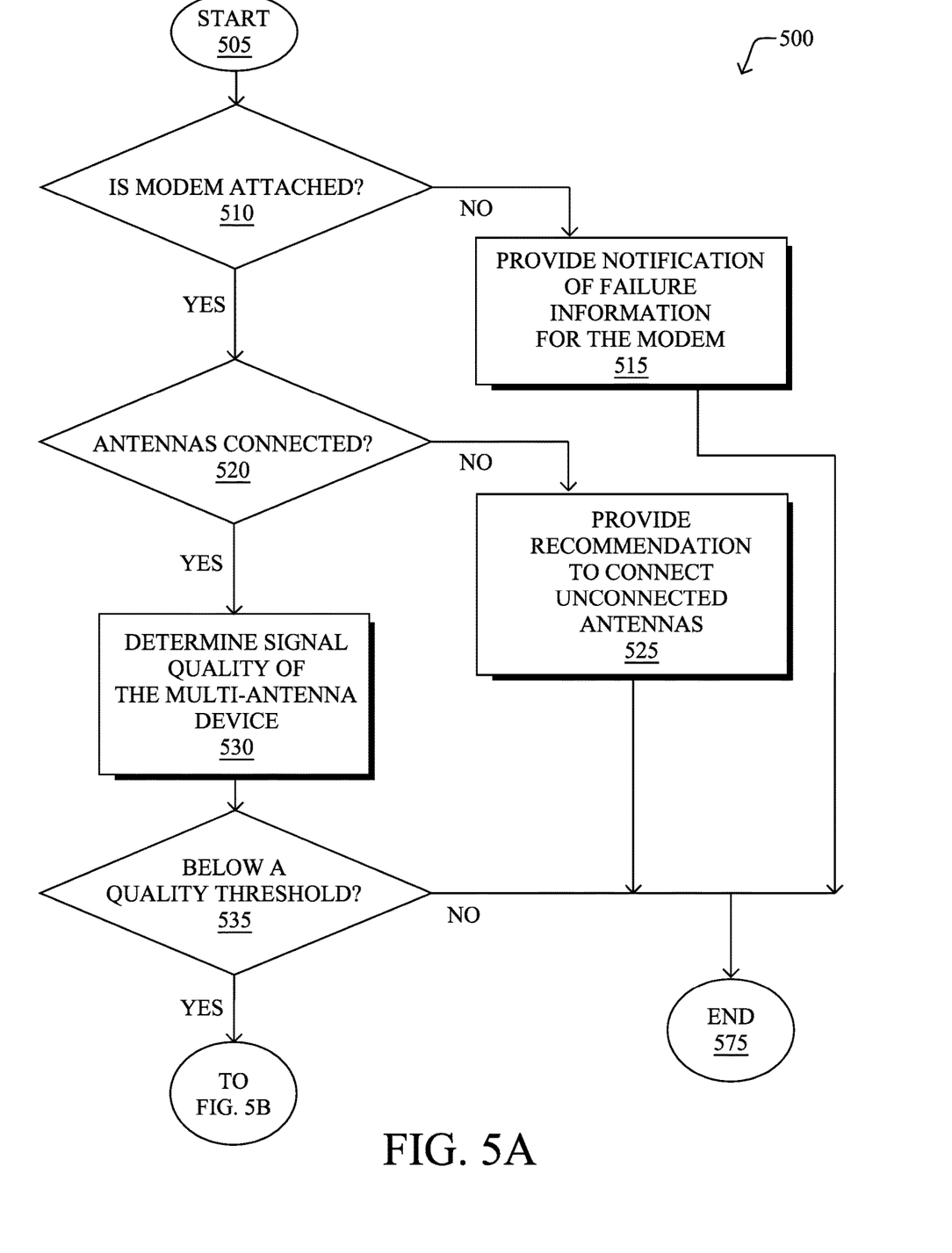
FIGS. 5A-5B illustrate an example simplified procedure for optimizing multi-antenna device configuration.
Figure 5B:
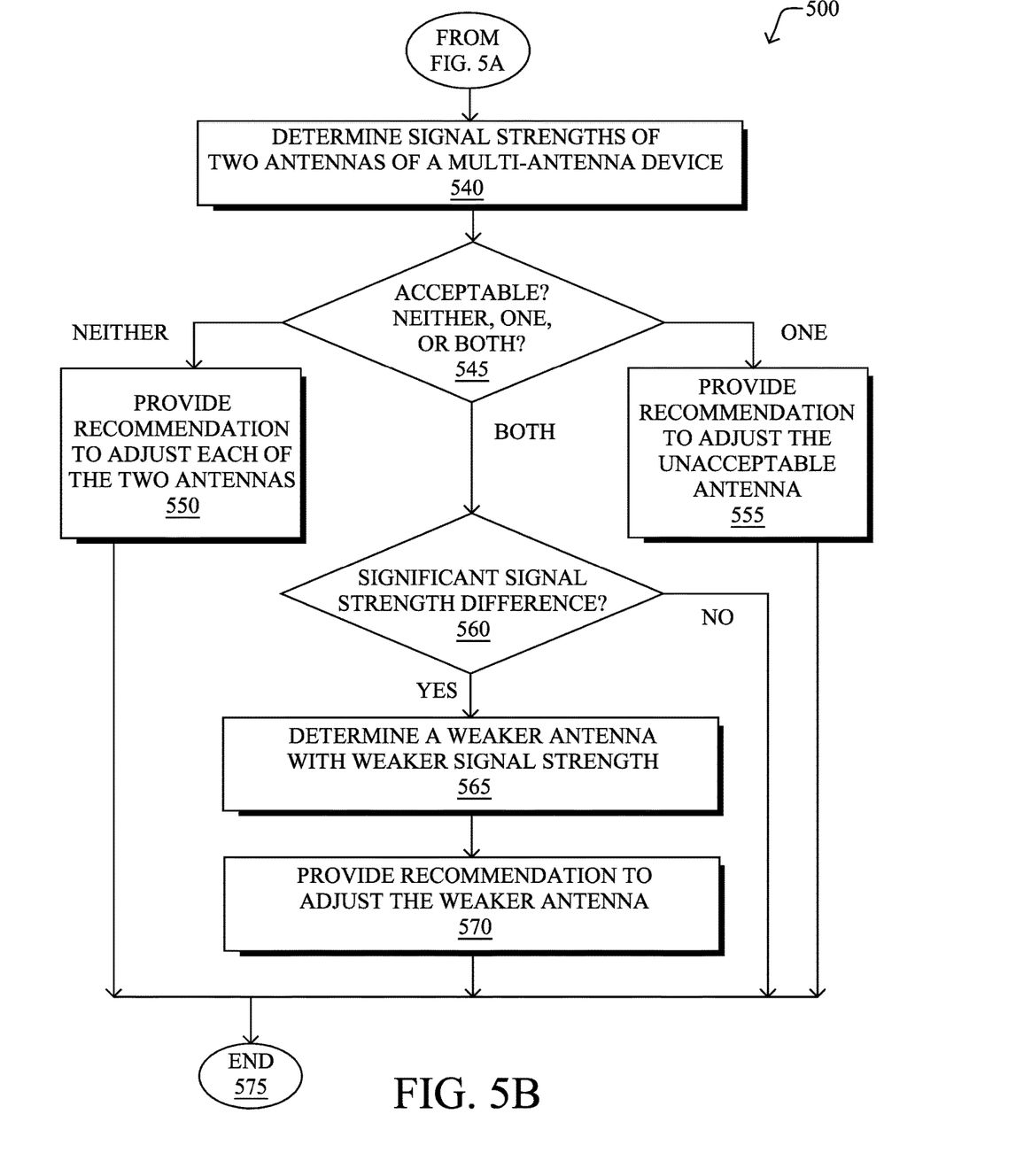

FIGS. 5A-5B illustrate another example simplified procedure for optimizing multi-antenna device configuration in accordance with one or more embodiments described herein. For example, a non-generic, specifically configured device (e.g., device 200) may perform procedure 500 by executing stored instructions (e.g., process 248). Illustratively, the device 200 may be a diagnostic device 330, or the multi-antenna device 310, itself. As described above, the two antennas may comprise a main antenna 312 and a diversity antenna 314, though other multi-antenna arrangements may be used herein, too, cellular antennas or otherwise.

The procedure 500 may start at step 505, and continues to step 510, where, as described in greater detail above, a diagnosing device 330 determines whether a modem 215 of the multi-antenna device 310 is attached to a wireless network 300. If not, then in step 515 the diagnosing device provides a notification of failure information for the modem (e.g., an email, SMS, light indication, etc. to a user or otherwise).

In step 520, the diagnosing device may also determine connectivity of the two antennas 312/314 on the multi-antenna device based on reading antenna hardware registers for the two antennas, as described above. In this instance, if there is no connectivity for one or both of the antennas (e.g., unplugged, loose, etc.), then in step 525 the diagnosing device may provide a recommendation to connect any of the two antennas that are not connected.

If the modem is attached and the antennas are connected, then in step 530 the diagnosing device 330 may determine a signal quality of the multi-antenna device. In response to acceptable signal quality in step 535, the procedure may then end in FIG. 5A in step 575. However, in response to determining that the signal quality is below a quality threshold in step 535, then the procedure 500 continues to FIG. 5B, where, in step 540, the diagnosing device may determine signal strengths of the two antennas 512/514 of the multi-antenna device.

In step 545, the diagnosing device may determine whether neither, only one, or both of the signal strengths are acceptable for the two antennas.

In step 550, when the signal strength of each of the two antennas is unacceptable (i.e., "neither"), then the diagnostic device may provide a recommendation to adjust each of the two antennas.

In step 555, when the signal strength of a first antenna of the two antennas is unacceptable while the signal strength of a second antenna of the two antennas is acceptable (i.e., "one"), the diagnostic device may provide a recommendation to adjust the first antenna.

However, in accordance with the techniques herein, in step 560, when the signal strength of each of the two antennas is acceptable, the diagnosing device first determines whether a difference between the signal strength of a first antenna and a second antenna is of the two antennas is greater than a threshold (e.g., 5 dB). If so (i.e., unbalanced antennas), then in step 565 the diagnosing device may determine a weaker antenna with weaker signal strength between the first antenna and the second antenna, and then provides a recommendation to adjust the weaker antenna in step 570.

As described above, any of the provided recommendations 340 may be configured in a suitable manner, such as indicating which antennas require adjusting by one or more lights on the multi-antenna device, or by a readable message (SMS, email, etc.) sent to a user. Further in one embodiment, the antennas 512/514 may be configured to be auto-adjusted based on the provided recommendation from the diagnostic device (e.g., servos and/or actuators that are configured to adjust the positioning of the antennas).

The illustrative procedure 500 may then end in step 575, notably with the option to continue monitoring and adjusting the antennas, accordingly.

It should be noted that while certain steps within procedure 500 may be optional as described above, the steps shown in FIGS. 5A-5B are merely examples for illustration, and certain other steps may be included or excluded as desired. Further, while a particular order of the steps is shown, this ordering is merely illustrative, and any suitable arrangement of the steps may be utilized without departing from the scope of the embodiments herein. In particular, the order of troubleshooting need not be limited to the example shown (e.g., modem attachment, antenna connection, signal quality, then signal strengths), and any suitable order may be used in accordance with the techniques herein, including omitting certain stages entirely.

The techniques described herein, therefore, provide for optimizing multi-antenna device configuration. In particular, the techniques herein substantially assist users in multi-antenna installation and troubleshooting, and essentially allow a user to place a device (and particularly its antennas) in the right place to achieve optimum performance. Generally, the techniques herein are particularly useful for customers and field engineers who need help installing and configuring multi-antenna devices, though may also be used to provide additional information to support engineers.

As an example, assume that a user complains that her router can "hear" messages from the network (e.g., evident from paging the router, and other messages that the router is able to receive and decipher), but the network, for some reason, is unable to "hear" anything from the router. Based on conventional cellular radio displays, a very misleading picture can be created:

Radio Information
Radio power mode=ON;
LTE Rx Channel Number=1725;
LTE Tx Channel Number=19300;
LTE Band=3;
LTE Bandwidth=15 MHz;
Current RSSI=−59 dBm;
Current RSRP=−89 dBm;
Current RSRQ=−12 dB;
Current SNR=2.0 dB;
Radio Access Technology (RAT) Preference=LTE;
Radio Access Technology (RAT) Selected=LTE.

However, by using the techniques herein, and examining the signal strengths of the individual antennas, observed values for Rx0 (main antenna, Tx and Rx) and Rx1 (diversity, Rx only) may be determined at various times "T(a)-T(d)" as follows:

T(a): Rx0:−136.19 dBm;
T(a): Rx1:−94.00 dBm;
T(b): Rx0:−93.38 dBm;
T(b): Rx1:−61.88 dBm;
T(c): Rx0:−10.00 dB;
T(c): Rx1:−00.30 dB;
T(d): Rx0:−22.81 dB;
T(d): Rx1:−12.13 dB.

As can be seen, the two antennas are heavily imbalanced from the receive (Rx) perspective. That is, while these values should only be a dB or two apart in the difference between them, instead the reference signal receive power (RSRP), for instance, is up to 42 dB apart at T(a). With such an imbalance, in favor of Rx1 (a receive only antenna), and against Rx0 (both transmit and receive), the user's router likely believes that the receive signal is strong enough to transmit data at a level that is far too low, resulting in the transmitted data signal dying, for example, well before it reaches an associated base station (e.g., an Evolved node B, or "eNB"). According to the techniques described above, therefore, such difficult-to-diagnose issues of the router may not only be determined, but also recommendations may be made to the user to adjust the router's antennas in order to fix the problem. (Note that if the issue is still not corrected, than perhaps there is a greater issue causing the problem, and the user may replace or otherwise repair the malfunctioning router.)

Note further that if the criteria of the embodiments described above are applied periodically, the techniques herein may also gather the information and use it to make recommendations for repositioning of antennas based on historical data.

While there have been shown and described illustrative embodiments that provide for optimized multi-antenna device configuration, it is to be understood that various other adaptations and modifications may be made within the spirit and scope of the embodiments herein. For example, while certain embodiments are described herein with respect to "IoT" networks in particular, the techniques are not limited as such and may be used with computer networks, generally, in other embodiments. In addition, while certain devices are shown, such as routers, access points, gateways, etc., other suitable is devices may be used, accordingly. Moreover, the techniques herein may have been described in terms of particular terminology that might infer cellular antennas. However, the embodiments in their broader sense are not as limited, and may, in fact, be used with other types of wireless networks and protocols, regardless of their underlying communication protocol.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a diagnostic device and after determining a modem of a multi-antenna device is attached to a wireless network, connectivity of two antennas of the multi-antenna device by reading antenna hardware registers for the two antennas of the multi-antenna device and signal strengths of the two antennas by making one or more function calls for computing a signal quality of the multi-antenna device based on the modem;
   determining, by the diagnostic device and based on the determined connectivity of the two antennas and the determined signal strengths of the two antennas, whether a signal strength of a first antenna of the two antennas is acceptable or unacceptable and whether a signal strength of a second antenna of the two antennas is acceptable or unacceptable;
   in response to determining that the signal strengths of the first antenna and the second antenna are unacceptable, providing, by the diagnostic device, a recommendation to adjust physical positioning of each of the two antennas on the multi-antenna device;
   in response to determining that the signal strength of the first antenna is unacceptable while the signal strength of the second antenna is acceptable, providing, by the diagnostic device, a recommendation to adjust physical positioning of the first antenna on the multi-antenna device; and
   in response to determining that the signal strengths of the first antenna and the second antenna are acceptable, but a difference between the signal strength of the first antenna and the second antenna is greater than a threshold:
  determining, by the diagnostic device, a weaker antenna with weaker signal strength between the first antenna and the second antenna; and
  providing, by the diagnostic device, a recommendation to adjust physical positioning of the weaker antenna on the multi-antenna device.

2. The method as in claim 1, further comprising:
determining the signal strengths and providing the recommendation only when the signal quality is below a quality threshold.

3. The method as in claim 1, further comprising:
providing a recommendation to connect any of the two antennas that are not connected.

4. The method as in claim 1, further comprising:
providing a notification of failure information for the modem when the modem is not attached to the wireless network.

5. The method as in claim 1, wherein the diagnostic device is the multi-antenna device.

6. The method as in claim 1, wherein the threshold is 5 dB.

7. The method as in claim 1, wherein the two antennas comprise a main antenna and a diversity antenna.

8. The method as in claim 1, wherein the two antennas are cellular antennas.

9. The method as in claim 1, wherein providing a recommendation comprises one of either:
  indicating, by one or more lights on the multi-antenna device, which antennas require adjusting; or
  indicating, by a readable message sent to a user, which antennas require adjusting.

10. The method as in claim 1, further comprising:
auto-adjusting, by the multi-antenna device, one or both of the two antennas based on the provided recommendation from the diagnostic device.

11. A tangible, non-transitory, computer-readable medium storing program instructions that cause a computer of a diagnostic device to execute a process comprising:
  determining, after determining a modem of a multi-antenna device is attached to a wireless network, connectivity of two antennas of the multi-antenna device by reading antenna hardware registers for the two antennas of the multi-antenna device and signal strengths of the two antennas by making one or more function calls for computing a signal quality of the multi-antenna device based on the modem;
  determining, by the diagnostic device and based on the determined connectivity of the two antennas and the determined signal strengths of the two antennas, whether a signal strength of a first antenna of the two antennas is acceptable or unacceptable and whether a signal strength of a second antenna of the two antennas is acceptable or unacceptable;
  in response to determining that the signal strengths of the first antenna and the second antenna are unacceptable, providing, by the diagnostic device, a recommendation to adjust physical positioning of each of the two antennas on the multi-antenna device;
  in response to determining that the signal strength of the first antenna is unacceptable while the signal strength of the second antenna is acceptable, providing, by the diagnostic device, a recommendation to adjust physical positioning of the first antenna on the multi-antenna device; and
  in response to determining that the signal strengths of the first antenna and the second antenna are acceptable, but a difference between the signal strength of the first antenna and the second antenna is greater than a threshold:
    determining a weaker antenna with weaker signal strength between the first antenna and the second antenna; and
    providing a recommendation to adjust physical positioning of the weaker antenna on the multi-antenna device.

12. The computer-readable medium as in claim 11, wherein the process further comprises:
determining the signal strengths and providing the recommendation only when the signal quality is below a quality threshold.

13. The computer-readable medium as in claim 11, wherein the process further comprises:
providing a recommendation to connect any of the two antennas that are not connected.

14. The computer-readable medium as in claim 11, wherein the process further comprises:
providing a notification of failure information for the modem when the modem is not attached to the wireless network.

15. The computer-readable medium as in claim 11, wherein the diagnostic device is the multi-antenna device.

16. An apparatus, comprising:
  one or more network interfaces configured to communicate in a computer network;
  a processor coupled to the network interfaces and adapted to execute one or more processes; and
  a memory configured to store a process executable by the processor, the process when executed operable to:
    determine, after determining a modem of a multi-antenna device is attached to a wireless network, connectivity of two antennas of the multi-antenna device by reading antenna hardware registers for the two antennas of the multi-antenna device and signal strengths of the two antennas by making one or more function calls for computing a signal quality of the multi-antenna device based on the modem;
    determine, based on the determined connectivity of the two antennas and the determined signal strengths of the two antennas, whether a signal strength of a first antenna of the two antennas is acceptable or unacceptable and whether a signal strength of a second antenna of the two antennas is acceptable or unacceptable;
    in response to a determination that the signal strengths of the first antenna and the second antenna are unacceptable, provide a recommendation to adjust physical positioning of each of the two antennas on the multi-antenna device;
    in response a determination that the signal strength of the first antenna is unacceptable while the signal strength of the second antenna is acceptable, provide a recommendation to adjust physical positioning of the first antenna on the multi-antenna device; and
    in response a determination that the signal strengths of the first antenna and the second antenna are is acceptable, but a difference between the signal strength of a first antenna and a second antenna of the two antennas is greater than a threshold:
      determine a weaker antenna with weaker signal strength between the first antenna and the second antenna; and provide a recommendation to adjust physical positioning of the weaker antenna on the multi-antenna device.

17. The apparatus as in claim 16, wherein the process, when executed, is further operable to:
   determine the signal strengths and providing the recommendation only when the signal quality is below a quality threshold.

18. The apparatus as in claim 16, wherein the process, when executed, is further operable to:
   provide a recommendation to connect any of the two antennas that are not connected.

19. The apparatus as in claim 16, wherein the process, when executed, is further operable to:
   provide a notification of failure information for the modem when the modem is not attached to the wireless network.

20. The apparatus as in claim 16, wherein the apparatus is the multi-antenna device.

\* \* \* \* \*

UNITED STATES PATENT AND TRADEMARK OFFICE
CERTIFICATE OF CORRECTION

PATENT NO. : 10,798,591 B2
APPLICATION NO. : 15/581007
DATED : October 6, 2020
INVENTOR(S) : Madhusudana Rao Kata et al.

Page 1 of 1

It is certified that error appears in the above-identified patent and that said Letters Patent is hereby corrected as shown below:

In the Specification

In Column 1, Line 26, please amend as shown:
accompanying drawings in which like reference numerals In Column 3, Line 47, please amend as shown:
nicating data over links coupled to the network 100, e.g., In Column 4, Line 23, please amend as shown:
readable media, may be used to store and execute program In Column 4, Line 64, please amend as shown:
due to physical configuration of the multiple antennas, In Column 6, Line 12, please amend as shown:
they are connected and/or configured properly. There is a In Column 10, Line 14, please amend as shown:
sutiable devices may be used, accordingly. Moreover, the Signed and Sealed this
Fifth Day of January, 2021

Andrei Iancu
*Director of the United States Patent and Trademark Office*